UNITED STATES PATENT OFFICE.

OTTO FRIEDBERGER, OF GIESSEN, GERMANY, ASSIGNOR OF ONE-THIRD TO EUGENE A. BYRNES, CLINTON PAUL TOWNSEND, AND JOHN H. BRICKENSTEIN.

PROCESS OF MAKING LACTIC ACID.

1,074,708.  Specification of Letters Patent.  Patented Oct. 7, 1913.

No Drawing.  Application filed January 18, 1912. Serial No. 671,956.

*To all whom it may concern:*

Be it known that I, OTTO FRIEDBERGER, Ph. D., chemist, a subject of the Emperor of Germany, residing at Giessen, Germany, have invented certain new and useful Improvements in Processes of Making Lactic Acid, of which the following is a specification.

Lactic acid as hitherto produced by fermentation from maize or potato starch saccharified with malt, possesses an unpleasant taste and disagreeable odor, which render the product unfit for many industrial applications as well as for human consumption. These objectionable properties of commercial lactic acid are mainly due to the presence of oily and albuminous impurities, and to the fact that by the hitherto-known methods of fermentation, other fatty acids are simultaneously formed, such as butyric acid, which are bodies of strong and undesirable taste and odor.

I have now discovered a new fermentation process of commercially and quantitatively converting carbohydrates or saccharids, *e. g.* dextrose and other fermentable sugars, into a lactic acid which is free from undesirable oily, albuminous and fatty-acid impurities, and which possesses a taste and odor making it available as a digestant and general acid condiment.

As starting material I use, for example, dextrose, grape-sugar, glucose, starch sugar, anhydrous sugar and the like, and I primarily employ as a converting agent a suitable, specially-treated bacillus, to wit, the *Bacillus Delbrucki*. This bacillus, in its normal state, quickly and completely converts maltose into lactic acid, but only slightly acidulates dextrose. For the purpose of the present invention the *Bacillus Delbrucki* is first brought to a healthy development in a solution of maltose for two days, at a temperature of 120–125° F. Thereupon it is gradually accustomed to dextrose by daily additions, over a period of about three days, of about one-fourth of its volume of a ten per cent. solution of dextrose, which it then completely ferments to lactic acid. The prepared bacillus is then added to the solution to be fermented, for example a ten per cent. dextrose solution, which has first been sterilized, by boiling it for one hour with steam, and then again cooled to 120° F. The fermentation is first left to itself for two days, at 120° F., with intermittent or constant agitation in the presence of sufficient sterilized chalk liquor to bind all the lactic acid theoretically expected.

In order to obtain a quantitative conversion of the sugar into lactic acid, it is necessary to further make use of two other species of bacilli, to wit, the *Bacillus Bulgaricus* and the *Bacillus acidi lactici*, which may be added at the end of the initial two-days' treatment. The fermentation is then again left to itself for a further period of six days, at a temperature of 110–115° F., whereby complete conversion is effected. As food for the bacilli during the fermentation I employ asparagin and peptone, or other nitrogenous products, which have to be free, and I use of each about 0.5% calculated upon the sugar. These substances are free from starch, oil and dextrin, and have proved to be very excellent food for the bacilli and not to bring any impurities into the fermentation. The fermentation-liquid is then filtered through bone-black, yielding an absolutely-clear calcium lactate liquor, which is concentrated *in vacuo*. The dry product is then treated with sulfuric acid, liberating nearly water-clear lactic acid, free from any appreciable amount of foreign bodies.

The details of the process described, with regard to the concentration of the solution, duration of fermenting and the temperature employed, may be somewhat varied.

I claim:

1. The process of producing lactic acid, which consists in fermenting a saccharid, by the *Bacillus Delbrucki*, previously brought to a healthy development and accustomed to dextrose.

2. The process of producing lactic acid, which consists in fermenting a saccharid, by the *Bacillus Delbrucki*, previously brought to a healthy development in a solution of maltose and then accustomed to dextrose by the gradual addition of a dextrose solution, and completing the fermentation by cultures of the *Bacillus acidi lactici* and the *Bacillus Bulgaricus*.

3. The process of producing lactic acid, which consists in fermenting a sterilized solution, having a strength of about ten per cent., of a saccharid, by the *Bacillus Delbrucki*, previously brought to a healthy development in a solution of maltose for about two days at a temperature of about 120–125° F. and then accustomed to dextrose by daily additions for about three days of a dextrose solution.

4. The process of producing lactic acid, which consists in fermenting a sterilized solution, having a strength of about ten per cent., of a saccharid, by the *Bacillus Delbrucki*, previously brought to a healthy development in a solution of maltose for about two days at a temperature of about 120–125° F. and then accustomed to dextrose by daily additions for about three days of a dextrose solution, and completing the fermentation by cultures of *Bacillus acidi lactici* and *Bacillus Bulgaricus* at a temperature of about 110–115° F.

5. The process of producing lactic acid, which consists in fermenting a saccharid, in the presence of a nitrogenous food for the bacillus, by the *Bacillus Delbrucki*, previously brought to a healthy development and accustomed to dextrose.

6. The process of producing lactic acid, which consists in fermenting a saccharid, by the *Bacillus Delbrucki*, previously brought to a healthy development in a solution of maltose and then accustomed to dextrose by the gradual addition of a dextrose solution, and completing the fermentation by cultures of the *Bacillus acidi lactici* and the *Bacillus Bulgaricus*, the fermentations being effected in the presence of a nitrogenous food for the bacilli.

In testimony whereof I affix my signature in presence of two witnesses.

OTTO FRIEDBERGER.

Witnesses:
JEAN GRUND,
CARL GRUND.